UNITED STATES PATENT OFFICE.

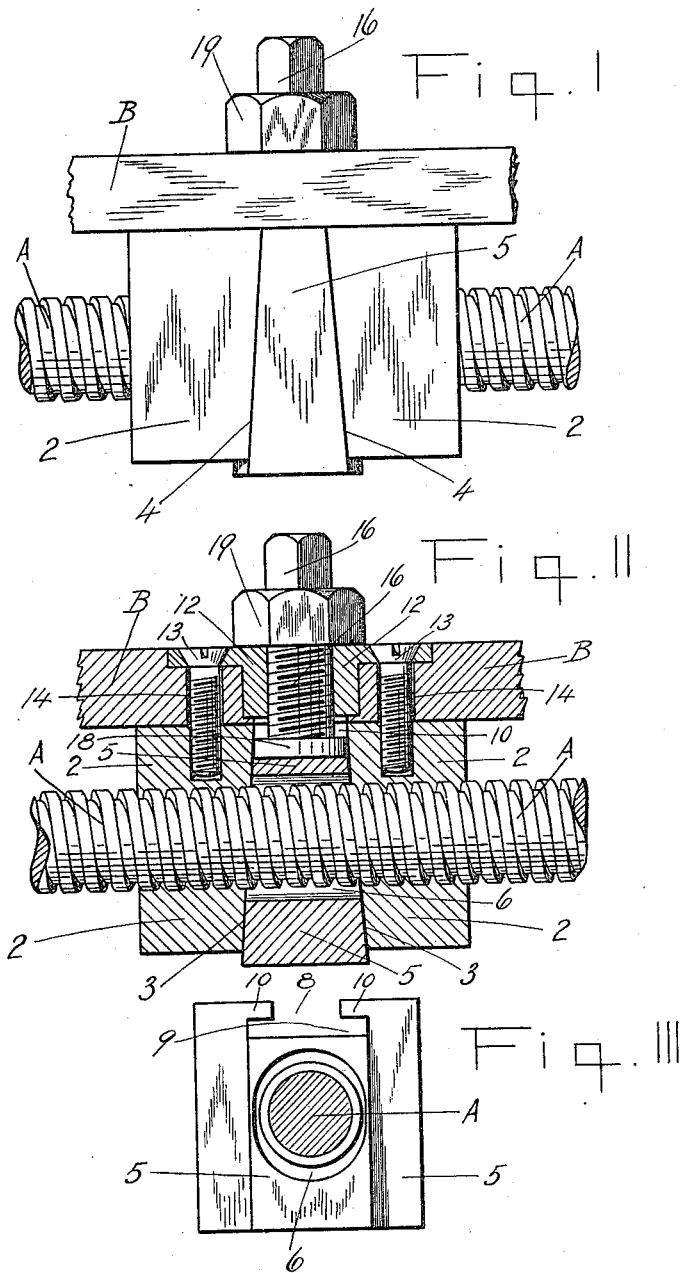

JOB DUDLEY AND HARRY EDWARD PLASTOW, OF HAMILTON, ONTARIO, CANADA, ASSIGNORS OF ONE-THIRD TO FREDERICK JAMES HIGHLAND, OF HAMILTON, ONTARIO, CANADA.

SCREW ADJUSTING AND LOCKING DEVICE.

1,153,861.

Specification of Letters Patent.

Patented Sept. 14, 1915.

Application filed May 3, 1915. Serial No. 25,586.

*To all whom it may concern:*

Be it known that we, JOB DUDLEY and HARRY EDWARD PLASTOW, both subjects of the King of Great Britain, and residents of Hamilton, in the county of Wentworth and Province of Ontario, Canada, have jointly invented new and useful Improvements in Screw Adjusting and Locking Devices, of which the following is a specification.

Our invention relates to improvements in screw adjusting and locking device, for the purpose of taking up the lost motion in nuts and screws, thereby improving the cutting tool adjusting mechanism in lathes, planers, shapers and other general iron working machines.

The objects of our invention are, first, to provide a device which will be a valuable addition to a certain class of iron working machines, in order to facilitate the work being accomplished thereby, and which can be made more accurate; second, to take up the lost motion in the screws of all machines, this feature is of great advantage, especially to the mechanic working on the machine; third, to provide means whereby it will not be necessary for the mechanic to keep in mind the amount of lost motion, which otherwise he would have to contend with; and fourth; to avoid jars and ragged cuts in the work, and to prevent the tool from being pulled into the work, consequently the possible breaking of the tool thereby. Further, the lost motion lock is a protection against all the previously mentioned defects, the tool carriage is made absolutely rigid with the saddle, or feed screw of a lathe, when taking a parallel cut. And further, a machine provided with our invention, would cause the machine to work true and accurately, and would be dependable, therefore requiring less watching and care over the cutting parts. We attain these objects by the mechanism illustrated in the accompanying drawing, in which:—

Figure 1 is an elevation of the screw adjusting and locking device, locked in position on a horizontal feed screw of a lathe or other machine. Fig. 2 is a sectional elevation of the same, and Fig. 3 is an end elevation of the detached draw wedge, together with the feed screw in section.

Similar characters of reference refer to similar parts throughout the several views.

In the drawing, the horizontal tool feed screw of a lathe is indicated by A, and the tool rest carriage by B, the two indicated pieces of mechanism are common in lathes, and other iron working machines.

2, are screw blocks, having round threaded holes therethrough to screw snugly on the feed screw A, and apart, each said block has a tapered recess 3, extending from the bottom upward, thereby forming side flanges 4, to guide and to retain the draw wedge.

5, is the centrally located tapered draw wedge, having an oval opening 6, horizontally extending therethrough and sufficiently large in order not to interfere with the feed screw A, and the adjustability of the draw wedge. The tapered draw wedge 5, fits in close contact to the tapered or beveled ends of the screw blocks, and between the side flanges 4, thereof. The upper end of the draw-wedge 5, has an opening 8, and a larger recess 9, adjoining said opening, thereby forming lips 10.

12 is a bushing in the tool rest carriage B, and is secured therein by means of screws 13, which extend through the flange of the bushing, through the holes 14 in the tool carriage, and screwed a distance into the screw blocks 2, and thereby secure said tool carriage to said blocks. It will be noticed that the holes 14, referred to, are larger than the screws in order to allow a little clearance to the same, for adjusting purposes.

16 is a threaded bolt to screw through the threaded hole in the bushing, the top of the bolt has a squared head adapted to receive a wrench, and the lower end of the bolt has a collar 18, which fits snugly in and adapted to be rotated in opposite directions in the recess 9, in the draw wedge 5.

19 is a check nut on the bolt 16, and contacts with the top of the bushing.

The bolt 16 is rotated in one direction to lift the draw wedge and thereby tighten the screw blocks on and to the feed screw A, the nut 19 may then be tightened to retain the bolt 16, in set and adjusted position. When the collar 18 of the bolt 16, is raised by slightly turning the bolt in one direction, the draw-wedge is thereby raised, and at the same time the screw blocks 2, are pressed outwardly, that is, in opposite directions, and are thereby locked on the feed-screw A, together with the tool carriage B.

What we claim as our invention and desire to secure by Letters Patent, is:—

1. In a screw adjusting and locking device, a feed-screw, screw-block screwed thereon and apart, a tool rest carriage, a bushing therein secured to the carriage and the blocks, a tapered draw-wedge having an opening therethrough around said screw sufficient for the adjustment of the wedge, and a recess in the upper part thereof, a bolt provided with a head to fit into said recess and adapted to raise the wedge, thereby locking the carriage, and means on the bolt to lock the same.

2. In a screw adjusting and locking device, a tool carriage, a feed-screw, blocks having tapered ends opposite one to the other on said feed-screw, a tapered draw-wedge, having a recess in the smaller end portion thereof, said wedge conforming to said tapered ends, and having an opening therethrough around said feed screw to allow adjustment, means to secure the carriage to the blocks, and means on the carriage end in said recess to adjust the wedge thereby locking the carriage to the feed screw.

3. In a screw adjusting and locking device, a screw, screw-blocks having tapered ends opposite one to the other and threaded on the feed screw, a tool carriage, means to secure the carriage to the blocks, a tapered draw-wedge having an opening therethrough around and of larger size than the feed-screw, fitting to and conforming to said tapered ends, and having a recess therein, and adjusting means extending through the carriage and into said recess adapted to adjust said wedge and thereby lock said blocks to said feed-screw.

4. In a screw adjusting and locking device, a screw, screw-blocks having tapered ends opposite one to the other threaded on the screw, a tool carriage, means for securing the carriage to the blocks, and to allow a slight widening of the space between said blocks, a tapered wedge fitting loosely on the feed screw and snugly between said blocks, and means in the wedge and means in and on the rest to engage with the first mentioned means to adjust said wedge and thereby lock the blocks, together with the rest, to the screw.

5. In a screw adjusting and locking device, a screw, blocks threaded on the screw and a distance apart, and tapered on their opposite ends, a tapered wedge fitting loosely on the screw and snugly between said blocks, for locking said blocks on said screw.

JOB DUDLEY.
HARRY EDWARD PLASTOW.

Witnesses:
H. G. HENDRY,
W. J. BALLENTINE.

Copies of this patent may be obtained for five cents each, by addressing the "Commissioner of Patents, Washington, D. C."